United States Patent
Gerken, III et al.

(10) Patent No.: US 10,321,265 B2
(45) Date of Patent: Jun. 11, 2019

(54) DIAGNOSIS OF BEACONS IN AN OPEN ARCHITECTURE

(71) Applicant: International Business Machines Corporation, Armonk, NY (US)

(72) Inventors: John K. Gerken, III, Apex, NC (US); Jeremy A. Greenberger, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 88 days.

(21) Appl. No.: 14/944,637

(22) Filed: Nov. 18, 2015

(65) Prior Publication Data
US 2017/0142553 A1    May 18, 2017

(51) Int. Cl.
| H04W 24/00 | (2009.01) |
| H04W 4/02 | (2018.01) |
| H04W 40/24 | (2009.01) |
| H04W 4/80 | (2018.01) |
| H04W 84/12 | (2009.01) |

(52) U.S. Cl.
CPC ............ H04W 4/023 (2013.01); H04W 4/80 (2018.02); H04W 40/244 (2013.01); H04W 84/12 (2013.01)

(58) Field of Classification Search
CPC .......... G01S 5/0226; G01S 1/08; G01S 1/022; G01S 1/024; G01S 1/028; H04W 64/003
USPC ......... 455/456.1, 456.2, 456.3, 456.4, 456.5, 455/456.6; 340/988–996
See application file for complete search history.

(56) References Cited

U.S. PATENT DOCUMENTS

| 7,283,093 | B2 | 10/2007 | Do et al. | |
| 8,031,657 | B2* | 10/2011 | Jones | G01S 5/0242 370/328 |
| 8,738,032 | B2 | 5/2014 | Ziskind et al. | |
| 9,163,945 | B2* | 10/2015 | Do | G01C 21/005 |
| 9,813,862 | B2* | 11/2017 | Liu | H04W 4/023 |
| 9,980,137 | B2* | 5/2018 | South | H04W 12/06 |
| 2006/0087474 | A1* | 4/2006 | Do | G01S 1/024 342/386 |

(Continued)

FOREIGN PATENT DOCUMENTS

CN     103888548 A     6/2014

OTHER PUBLICATIONS

Ashok Yalamanchili, "Automatic Detection of iBeacon Failure Using Raspberry Pi", Apr. 14, 2015, 5 pages.

(Continued)

*Primary Examiner* — Matthew C Sams
(74) *Attorney, Agent, or Firm* — Maeve M. Carpenter; Hunter E. Webb; Keohane & D'Alessandro PLLC

(57) ABSTRACT

Embodiments described herein provide approaches for diagnosing a beacon in an open architecture. Specifically, each of a set of beacons is associated with a beacon location. Each beacon of the set of beacons is a transmit-only device that is designed to emit a relatively short-range electronic signal. When a mobile device, such as a cell phone, enters the venue, the location of the mobile device within the venue is determined. Any information received by the mobile device from the set of beacons is retrieved from the mobile device. This information is used in conjunction with the location of the mobile device to diagnose the operational status of the beacon.

20 Claims, 8 Drawing Sheets

(56) References Cited

U.S. PATENT DOCUMENTS

| | | | | |
|---|---|---|---|---|
| 2008/0025233 A1* | 1/2008 | Otsuka | H04W 84/20 | 370/254 |
| 2010/0120422 A1 | 5/2010 | Cheung et al. | | |
| 2012/0295654 A1* | 11/2012 | Sridhara | G01S 5/0226 | 455/517 |
| 2013/0023282 A1* | 1/2013 | Lin | G01S 5/021 | 455/456.1 |
| 2013/0267257 A1* | 10/2013 | Palanki | H04W 4/029 | 455/456.5 |
| 2014/0185518 A1* | 7/2014 | Ramakrishnan | H04W 4/023 | 370/328 |
| 2014/0217168 A1* | 8/2014 | Do | G01C 21/005 | 235/375 |
| 2014/0228044 A1* | 8/2014 | Jones, Jr. | G01S 5/0226 | 455/456.1 |
| 2014/0365488 A1* | 12/2014 | Arslan | G01S 5/0242 | 707/736 |
| 2015/0140954 A1* | 5/2015 | Maier | H04W 4/22 | 455/404.2 |
| 2015/0204649 A1* | 7/2015 | McFarthing | G01S 5/0263 | 702/150 |
| 2015/0254737 A1* | 9/2015 | Shin | G06Q 30/0281 | 705/14.5 |
| 2015/0304814 A1* | 10/2015 | Pandey | H04W 4/023 | 455/456.2 |
| 2015/0334582 A1* | 11/2015 | Liu | H04W 4/023 | 370/254 |
| 2016/0050526 A1* | 2/2016 | Liu | H04W 4/70 | 455/457 |
| 2016/0050564 A1* | 2/2016 | Niewczas | H04W 12/06 | 455/411 |
| 2016/0086029 A1* | 3/2016 | Dubuque | G06K 9/00536 | 382/159 |
| 2016/0294844 A1* | 10/2016 | Woo | H04L 63/12 | |
| 2016/0309478 A1* | 10/2016 | Nabetani | H04B 7/0697 | |
| 2017/0111763 A1* | 4/2017 | Morgan | H04W 4/029 | |
| 2017/0142553 A1* | 5/2017 | Gerken, III | H04W 4/023 | |
| 2017/0171754 A1* | 6/2017 | South | H04W 4/90 | |
| 2018/0132065 A1* | 5/2018 | Kang | H04W 4/023 | |

OTHER PUBLICATIONS

Estimote, "Apps and devices", https://community.estimote.com/hc/en-us/articles/204100866-Do-I-have- . . . , Copyright 2012-2014 by Estimote, Inc., 2 pages.

Navizon One, WiFi and Cell-ID location database with Global coverage, https://www.navizon.com/, Aug. 31, 2015, 2 pages.

Zebra, Wireless LAN, Are You Overpaying of Your Wireless LAN?, https://www.zebra.com/us/en/products/networks/wireless-lan.html, Copyright 2015 ZIH Corp., 3 pages.

"Cisco Service Provider Wi-Fi: A Platform for Business Innovation and Revenue", http://www.cisco.com/c/en/us/solutions/collateral/service-provider/servic . . . , Aug. 31, 2015, 8 pages.

* cited by examiner

DIAGNOSIS OF BEACONS IN AN OPEN ARCHITECTURE

TECHNICAL FIELD

The subject matter of this invention relates generally to diagnosing of hardware components. More specifically, aspects of the present invention provide an approach for diagnosing a beacon in an open architecture.

BACKGROUND

In the information technology environment of today, the collection and analysis of data is becoming increasingly important. As more and more resources become dedicated to data collection, the time and resources expended to deploy and maintain these systems can become large. Because of this, if the data collected by these systems becomes unreliable, the implementer's ability to effectively utilize the data can be negatively impacted, potentially degrading the ability of an implementer to react to events in real time. Further, unreliable data can also contaminate any aggregate and derived data that may be used for analysis, potentially corrupting an entire dataset. Still further, if the system or someone associated therewith is not aware that the data collected by a particular sensor has become unreliable, the user of the system may have no way of knowing that the data is suspect.

One type of sensor that is increasingly being utilized in certain environments is the BLE Beacon (or iBeacons), hereinafter "beacons". Beacons can be among the most popular solutions for providing enhanced experiences for customers of certain venues, which may include venues such as stadiums, airports, retail stores, and/or hospitals, among others. Beacons can be used in a wide range of applications, including sales promotions, tracking the location of important equipment, and/or building security, among others.

To perform these functions, beacons typically transmit only and do not receive. These beacons typically transmit a relatively short-range (e.g., currently having a specified maximum of 70 meters, but normally approximately 25 feet) wireless (e.g., Bluetooth) signal. This signal can be picked up by mobile devices enabled to receive the types of signals broadcast by the beacons, and an application operating on the device can be notified that the device is within the range of the signal of the beacon. One common protocol for operating beacons is called "Open Architecture". In this protocol, the beacons are relatively independent, and do not communicate with or connect with any type of network.

SUMMARY

In general, embodiments described herein provide approaches for diagnosing a beacon in an open architecture. Specifically, each of a set of beacons is associated with a beacon location. Each beacon of the set of beacons is a transmit-only device that is designed to emit a relatively short-range electronic signal. When a mobile device, such as a cell phone, enters the venue, the location of the mobile device within the venue is determined. Any information received by the mobile device from the set of beacons is retrieved from the mobile device. This information is used in conjunction with the location of the mobile device to diagnose the operational status of the beacon.

One aspect of the present invention includes a computer-implemented method for diagnosing a beacon in an open architecture, the method comprising: associating each of a set of beacons in a venue with an associated beacon location, each beacon of the set of beacons being a transmit-only device that is designed to emit a relatively short-range electronic signal; determining a location of a mobile device within the venue; retrieving, from the mobile device, any information received by the mobile device from the set of beacons; and diagnosing an operational status of a beacon based on the information and the location.

Another aspect of the present invention includes a computer system for diagnosing a beacon in an open architecture, the computer system comprising: a memory medium comprising program instructions; a bus coupled to the memory medium; and a processor for executing the program instructions, the instructions causing the system to: associate each of a set of beacons in a venue with an associated beacon location, each beacon of the set of beacons being a transmit-only device that is designed to emit a relatively short-range electronic signal; determine a location of a mobile device within the venue; retrieve, from the mobile device, any information received by the mobile device from the set of beacons; and diagnose an operational status of a beacon based on the information and the location.

Yet another aspect of the present invention includes a computer program product for diagnosing a beacon in an open architecture, the computer program product comprising a computer readable storage device, and program instructions stored on the computer readable storage device, to: associate each of a set of beacons in a venue with an associated beacon location, each beacon of the set of beacons being a transmit-only device that is designed to emit a relatively short-range electronic signal; determine a location of a mobile device within the venue; retrieve, from the mobile device, any information received by the mobile device from the set of beacons; and diagnose an operational status of a beacon based on the information and the location.

BRIEF DESCRIPTION OF THE DRAWINGS

These and other features of this invention will be more readily understood from the following detailed description of the various aspects of the invention taken in conjunction with the accompanying drawings in which.

Figure 1:
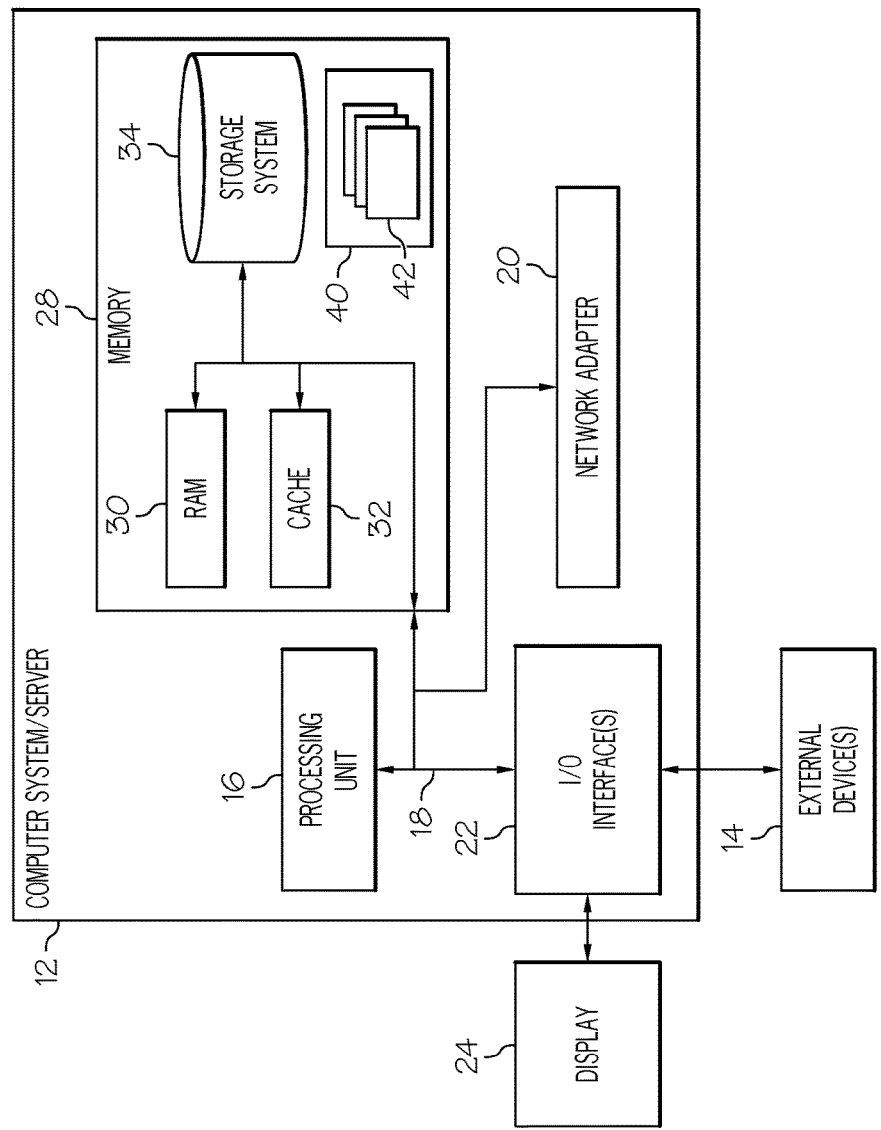
FIG. 1 shows a block diagram that illustrates a computer implementation in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

Also, the term "venue" is defined as any defined space within which mobile devices can be monitored (e.g., a place that can be visited by one or more patrons). The term "patron" as used herein refers to any person having an enabled mobile device allowing the person to be tracked and/or monitored via location sensing technologies as the patron moves in a venue. A patron may include, but is not limited to, a customer, client, frequenter, consumer, user, visitor, guest, or the like. The term "mobile device" as used herein refers to any mobile computerized device or device component having the ability to communicate using both relatively short range signals and communications signals and may be transported by a patron or embedded within a piece of equipment.

As stated above, embodiments described herein provide approaches for diagnosing a beacon in an open architecture. Specifically, each of a set of beacons is associated with a beacon location. Each beacon of the set of beacons is a transmit-only device that is designed to emit a relatively short-range electronic signal. When a mobile device, such as a cell phone, enters the venue, the location of the mobile device within the venue is determined. Any information received by the mobile device from the set of beacons is retrieved from the mobile device. This information is used in conjunction with the location of the mobile device to diagnose the operational status of the beacon.

Referring now to FIG. 1, a computerized implementation 10 of an embodiment for diagnosing a beacon in an open architecture is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for anonymous reporting of multiple venue location data to produce patron analytics and insights. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for creating a relationship with a community to enable a user to present browser content based on the browsing behavior of people in the community, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
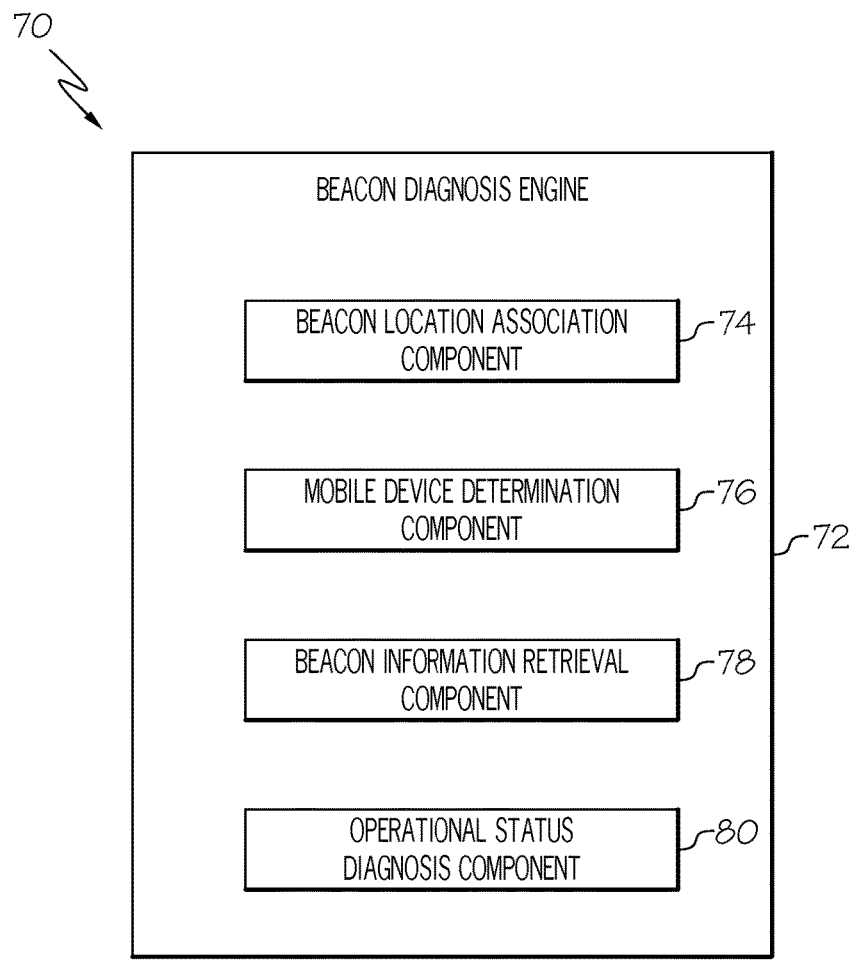
FIG. 2 shows a block diagram that illustrates a system according to illustrative embodiments.

Referring now to FIG. 2, a block diagram 70 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a beacon diagnosis engine (hereinafter "system 72"). Rather, system 72 could be loaded on a server or server-capable device that communicates (e.g., wirelessly) with the physical server to provide beacon diagnosis therefor. Regardless, as depicted, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Figure 3:
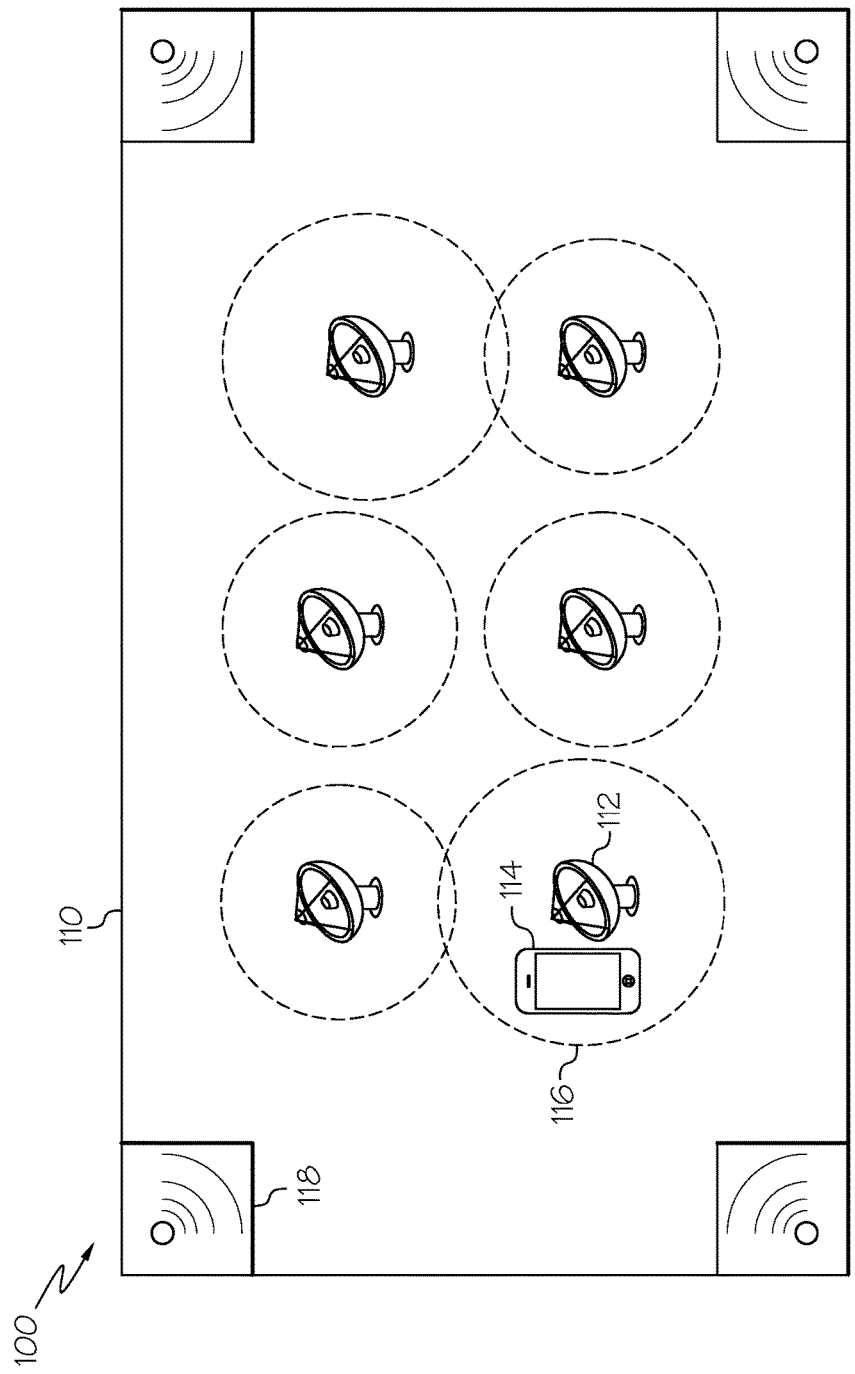
FIG. 3 shows an example venue according to illustrative embodiments.

Referring now to FIG. 3, an example venue 100 is illustrated according to embodiments of the invention. Venue 100 can include and/or be part of municipality, a neighborhood, a stadium, an airport, a retail complex, a retail store, a park, a golf course, a concert venue, a hospital and/or any other place that may be visited by a patron or piece of equipment having a mobile device. In any case, as shown, included within venue 100 is a set of beacons 112. Each beacon 112 in the set of beacons 112 is designed to transmit a specific type of relatively short range 116 wireless signal, which can be received by a mobile device 114. For example, in an embodiment, beacon 112 can be a BLE beacon (or iBeacon), which transmits a wireless Bluetooth signal. In any case, beacons 112 within venue 100 are configured in an open architecture. To this extent, beacons 112 do not receive communications but only transmit and do not connect to any sort of network. Also shown in venue 100 is a set of communicators 118. Communicators 118 can include Wi-Fi, radio, short wave, cellular, satellite, and/or any other type of communications protocol that can be used to communicate with a mobile device 114 (e.g., a cell phone). In any case, communicators 118 can be used to establish a connection to mobile device 114 (e.g., in response to receipt of a signal from beacon 112 by mobile device 114).

The inventors of the invention described herein have discovered certain deficiencies in the utilization of beacons 112 in a venue 100 using an open architecture protocol. For example, because the beacons 112 are open architecture type and do not connect to any network, these beacons 112 have no way of reporting errors or warning conditions without having a technician that has an application that is appropriate for the vendor of the beacons 112 to physically walk the venue and check each beacon for problems. Given that the range 116 for each beacon is typically approximately 25 feet and that a large venue (e.g., a stadium) may contain hundreds, if not thousands, of beacons such a physical inspection can be a large investment in time and resources. Further, this type of physical inspection would not be able to detect whether a specific beacon 112 has ceased to operate or that a beacon 112 has been moved. In order to determine these conditions, the technician would be required to specifically target each specific beacon 112 at a specific location, potentially costing even more time and resources.

Referring again to FIGS. 1-3, beacon location association component 74 of system 72, as executed by computer system/server 12, is configured to associate each of the set of beacons 112 in venue 100 with an associated beacon location. Beacon 112 locations can be expressed in GPS coordinates, Cartesian coordinates, as a distance and angle from a specific point, and/or using any other solution for specifying a location. In any case, beacon 112 locations can be determined upon initial placement or subsequent maintenance of a beacon 112. These locations can be associated with a unique identifier associated with the beacon and can be stored, such as in system storage 34.

Mobile device determination component 76 of system 72, as executed by computer system/server 12, is configured to determine a location of mobile device 114 within venue 110. For example, movements of a patron (e.g., a customer) having an enabled mobile device 114 can be tracked as the patron moves within venue 100. In an embodiment, the location can be determined using techniques currently known in the art, such as IBM® Presence Insights. IBM® Presence Insights works by sensing the presence of the mobile device 114 through a collection of location sensing technologies. For example, in an embodiment in which communicators 118 include a guest wireless fidelity (Wi-Fi) system in venue 110, the location of Wi-Fi enabled mobile devices that connect to communicators 118 can be triangulated based on the direction that the signal from the mobile device 114 is received by the communicators 118. In other embodiments including, but not limited to, outdoor venues 100, the location can be triangulated using GPS satellite and/or cellular tower-based communicators 118.

Figure 4:
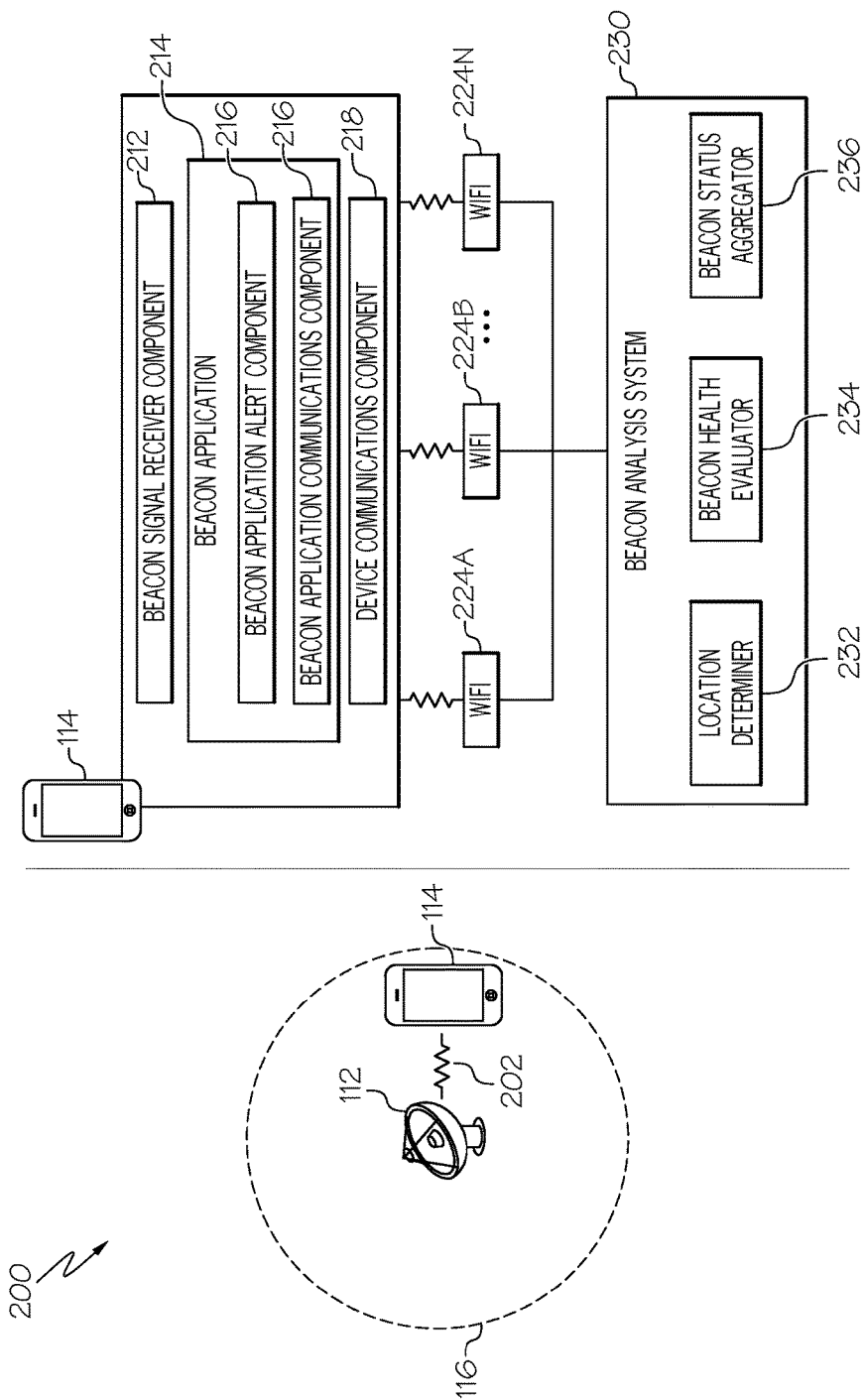
FIG. 4 shows an example system diagram according to illustrative embodiments.

Referring now to FIG. 4, an example system diagram 200 according to embodiments of the invention is shown. As shown, system diagram 200 includes a beacon 112, a mobile device 114, and a beacon analysis system 230. Mobile device 114 has a device communications component 218 which communicates with one or more communicators 118 (FIG. 3), such as Wi-Fi 224A-N, using any solution. Wi-Fi 224A-N, in turn, communicates with beacon analysis system 230. Location determiner 232 of beacon analysis system 230 analyzes the communications between device communications component 218 and Wi-Fi 224A-N to determine the location of mobile device 114 within area 110 (FIG. 3).

Referring now to FIGS. 1-4, beacon information retrieval component 78 of system 72, as executed by computer system/server 12, is configured to retrieve any information received by mobile device 114 within venue 100 from a beacon 112. For example, each beacon 112 in venue 100 is designed to transmit, independently from other beacons 112, a relatively short range electronic signal 202, which may take the form of a Bluetooth signal, among others. This signal 202 transmitted by a particular beacon 112 contains an identifier that uniquely identifies the particular beacon 112. Further, the signal 202 may be transmitted by a particular beacon 112 continuously or relatively continuously or, alternatively, may be transmitted periodically (e.g., as a "ping") with a certain period of time elapsing between consecutive signals 202.

In any case, when a mobile device 114 in venue 100 comes within an effective range 116 of a beacon 112, beacon signal receiver component 212 of mobile device 114 receives the signal 202 transmitted by beacon 112. In an embodiment, beacon signal receiver component 212 contacts beacon application alert component 216 of beacon application 214 to alert beacon application 214 that a signal 202 has been received from a beacon 112, which activates beacon application 214 on mobile device 114. In an embodiment, beacon application alert component 216 can also trigger an alert to activate a mobile device 114 that may be in an inactive state. This allows beacon application communications component 216 of beacon application 214 to utilize device communications component 218 to contact an entity associated with the beacons 112 and/or the venue 100 via Wi-Fi 224A- and to receive information, promotions, etc., from the entity. This contact can be made via a communicator 118 (e.g., Wi-Fi 224A-N) that is included in the same set of communicators 118 used by mobile device determination component 76 to determine the location of mobile device 114 or, alternatively, one or more separate communicators 118 can be utilized.

In any case, beacon information retrieval component 78 utilizes the contact established by beacon application communications component 216 to provide information about beacon 112 to beacon analysis system 230. As such, system 72 can be characterized as a "hybrid" system, with elements (e.g., communicators 118) that communicated using one type of communications technology (e.g., Wi-Fi) being utilized to analyze other elements (e.g., beacons 112) that communicate using a different technology (e.g., Bluetooth). To this extent, while mobile device 114 is within venue 100, any information broadcast by beacon 112 and received by mobile device 114 is forwarded by mobile device 114 to beacon analysis system 230. This information can include the identifier that uniquely identifies the specific beacon 112 from which the transmission 202 was received. In addition, beacon application communications component 216 of mobile device 114 can also forward other information about the transmission 202 received from beacon 112, such as the strength of the signal 202 received by mobile device 114 from beacon 112. To this extent, any mobile device 114 that comes within the effective range 116 of a beacon 112 can provide a continuous stream of information to beacon analysis system 230 regarding that beacon 112. Further, because the location of each mobile device 114 within the venue 100 is being continuously tracked, the information forwarded to beacon analysis system 230 will also indicate a point at which the mobile device 114 leaves the effective range 116 of beacon 112 signal 202, as well as locations within venue 100 in which no mobile device 114 receives no signal 202 from any beacon 112.

Operational status diagnosis component 80 of system 72, as executed by computer system/server 12, is configured to diagnose an operational status of beacon 114. This diagnosis can be performed by beacon health evaluator 234 based on the information sent to beacon analysis system 230 by mobile device 114 in combination with the location of mobile device 114 determined by location determiner 232. Further, beacon status aggregator 236 can collect and aggregate the information from the beacon 112 by various mobile devices 114 over a period of time. Beacon health evaluator 234 can use the aggregated information and/or baselines, averages, etc., collected over time by beacon status aggregator 236 to perform its diagnosis.

Figure 5:
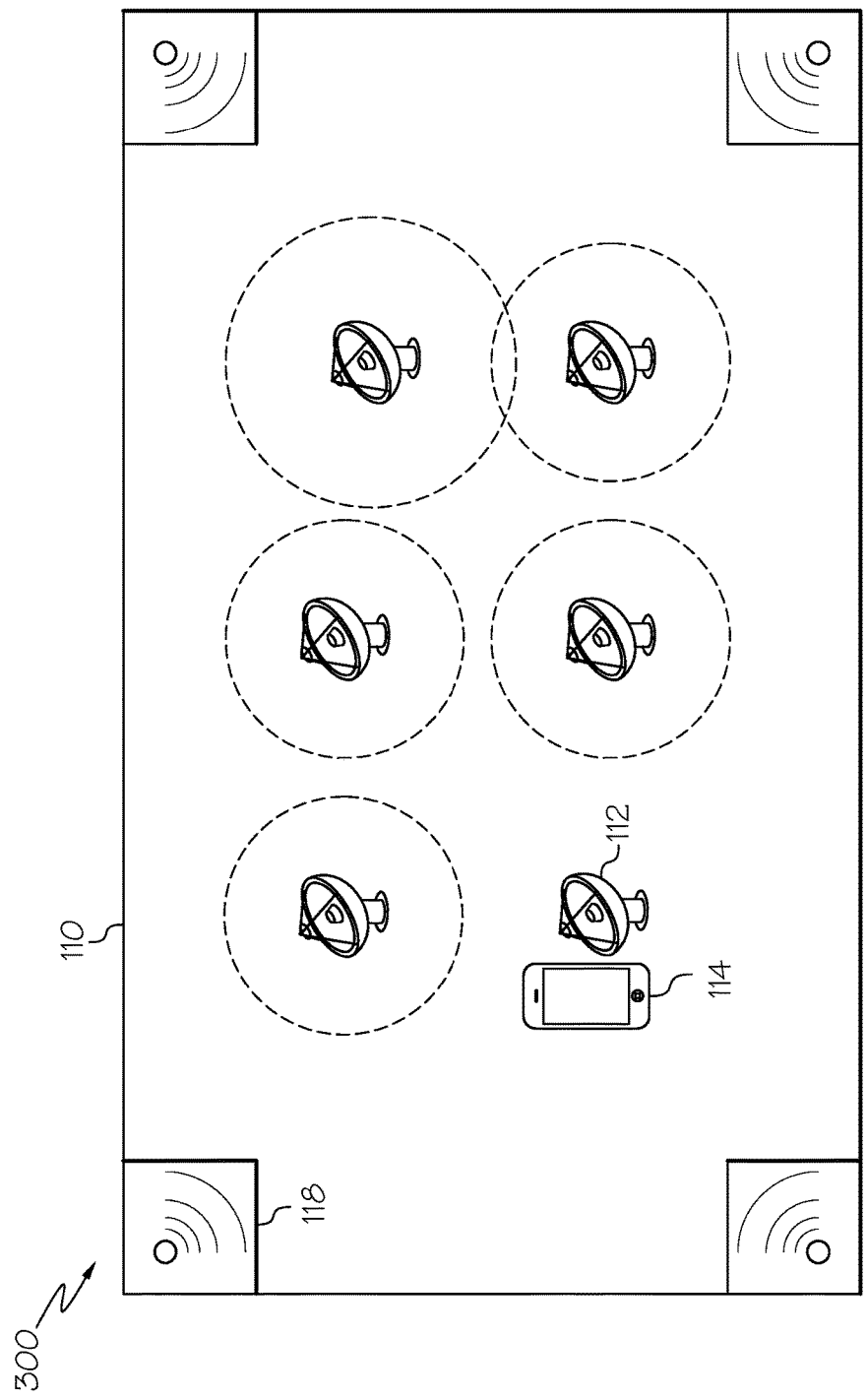
FIG. 5 shows an example venue according to illustrative embodiments.

For example, as illustrated in FIG. 5, if the location of the mobile device 114 is determined by location determiner 232 to be at beacon location associated with a beacon 112 or at a distance from the beacon location associated with a beacon 112 that is relatively small and no signal 202 is being received by mobile device 114, beacon health evaluator 234 may determine that the beacon 112 has either failed, as shown, or has been moved. Similarly, if the location of the mobile device 114 is determined by location determiner 232 to be at beacon location associated with a beacon 112 or a calculated distance from the beacon location associated with a beacon 112 is relatively small and the signal 202 being received by mobile device 114 is relatively weak, beacon health evaluator 234 can determine that the strength of the power source of the beacon 112 is weak and may need to be replaced.

To make this determination, the expected distance between the beacon 112 and mobile device 114 can be calculated using mathematical analysis and/or historical analysis. Mathematical analysis uses formulas to produce the ideal distance by reading the beacon RSSI strength and device location. The historical approach can augment any calculations based on aggregated information from beacon status aggregator 236 to determine a historical response based on information received from other mobile devices 114 in the past. This aggregated information can be used to adjust the expected distance to the current mobile device 114. As an example, if using historical analysis, it is determined that if a power source (e.g., battery) of a beacon 112 is draining, and thus the signal strength is weaker, a weaker signal can be expected the next time a mobile device 114 enters the expected vicinity of the beacon 112.

Figure 6:
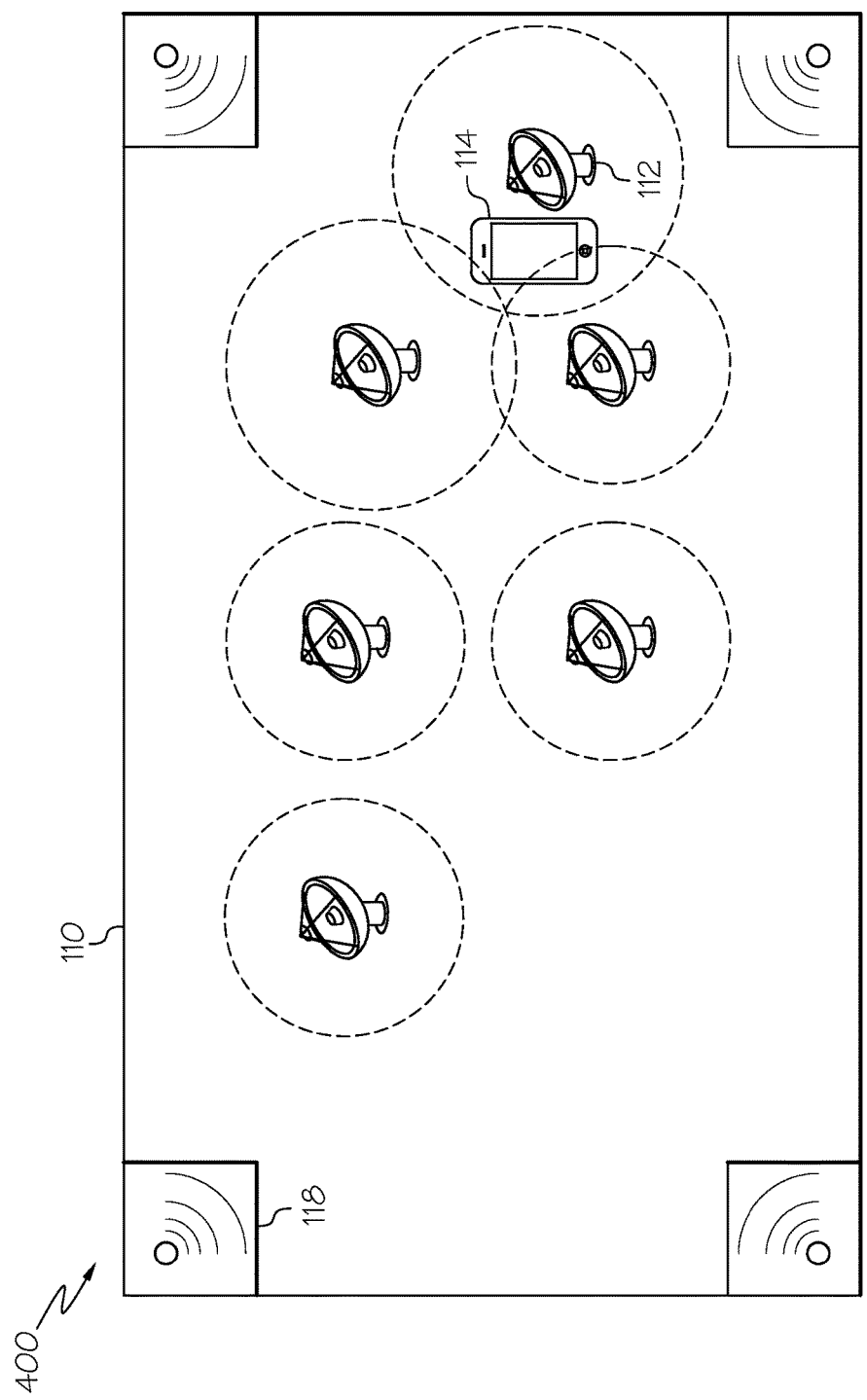
FIG. 6 shows an example venue according to illustrative embodiments.

In another example, as illustrated in FIG. 6, if the location of the mobile device 114 is determined by location determiner 232 to be removed from (e.g., outside a signal range of) the beacon location associated with a beacon 112 but a signal 202 is being received by mobile device 114, beacon health evaluator 234 may determine that the beacon 112 has been moved to a location that is proximate to the determined location of the mobile device 114.

Figure 7:
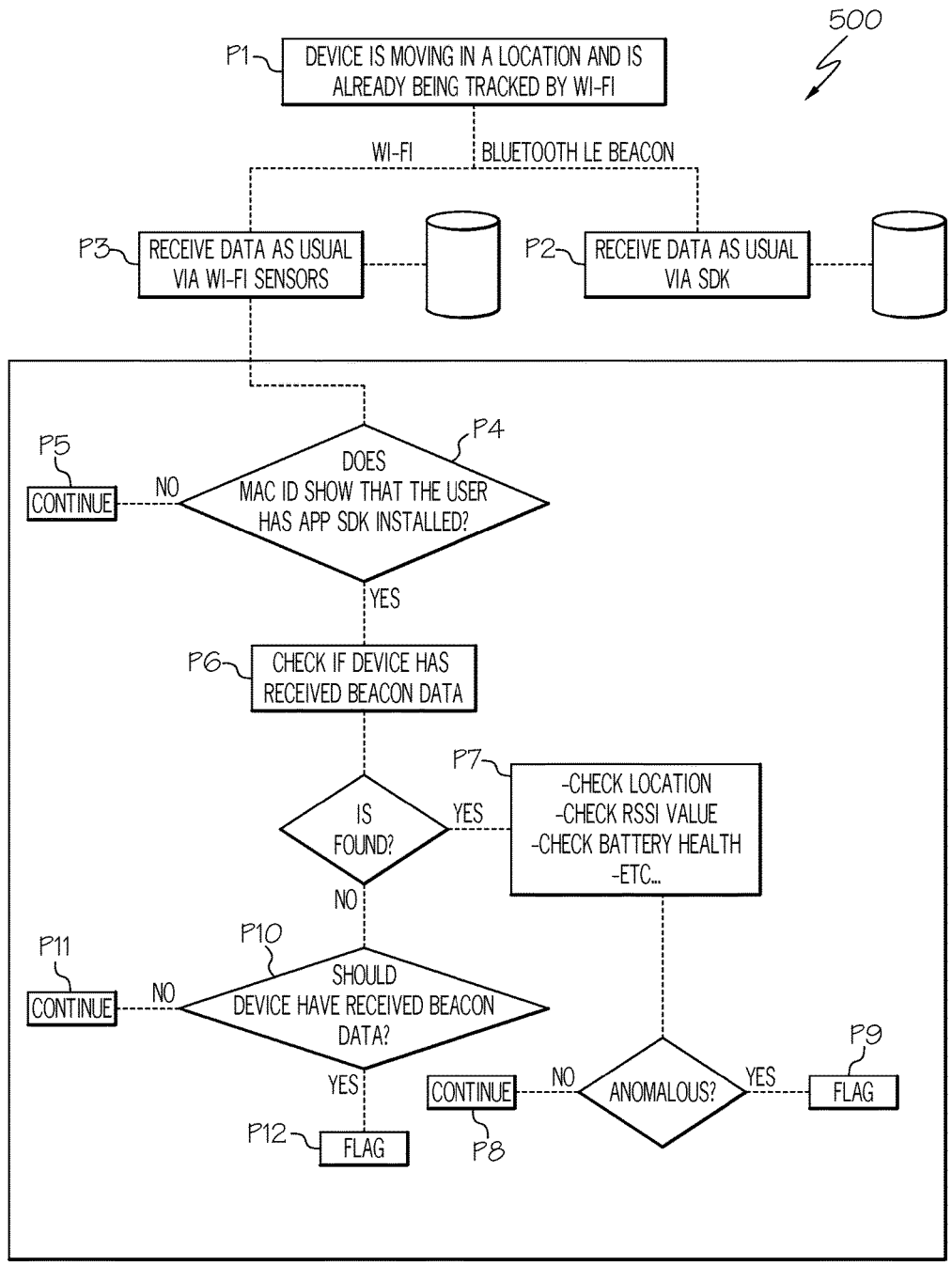
FIG. 7 shows a decision tree according to illustrative embodiments.

Referring now to FIG. 7, an implementation of a decision tree 500 that may be employed by beacon health evaluator 234 to diagnosing beacon 112 (FIG. 3) in an open architecture is shown. Referring additionally to FIGS. 3 and 4, in P1, mobile device 114 is moving in a location (e.g., within venue 100) and the location of mobile device 114 is being tracked by communicators 118 (e.g., by Wi-Fi). Mobile device 114 is receiving data from relatively short range wireless communications (e.g., via SDK) at P2 and is also receiving data from communicators 118 (e.g., via Wi-Fi sensors) at P3. At P4, a determination is made as to whether the MAC ID of mobile device 114 shows that beacon application 214 (SDK) is installed on mobile device 114. If not, the process continues at P5. If so, at P6, a check is made for whether mobile device 114 has received data (e.g., via signal 202) from a beacon 112. If data has been received from a beacon 112, the location, received signal strength indicator (RSSI value), battery health, etc., are checked by beacon health evaluator 234 to determine whether there is anomalous data at P7. If not, the process continues at P8. If anomalous data is determined to be present, a flag is set at P9 that indicates human intervention is necessary because the location or RSSI value of beacon 112 is incorrect or the battery health of beacon 112 is low. Otherwise, if no data (e.g., via signal 202) has been received from any beacon 112, beacon health evaluator 234 determines, based on the location of mobile device 114, whether a beacon 112 should be located in that location from which data should have been received at P10. If not, the process continues at P11. If a signal 202 from a beacon 112 should have been received, a flag is set indicating that the beacon 112 at this location is either missing or has a power source (e.g., battery) that is out of power.

Figure 8:
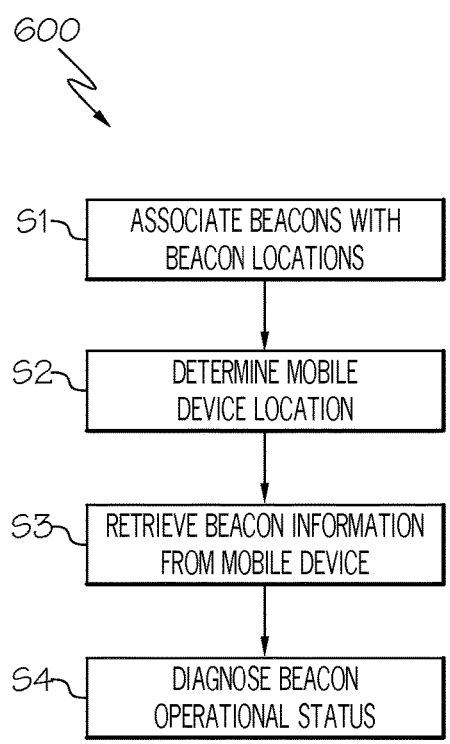
FIG. 8 shows a process flow diagram according to illustrative embodiments.

Referring now to FIG. 8 in conjunction with FIGS. 1-4, a method flow diagram 600 according to an embodiment of the present invention is shown. At S1, beacon location association component 74 of system 72, as executed by computer system/server 12, associates each of a set of beacons 112 in a venue 100 with an associated beacon location. At S2, mobile device determination component 76 determines a location of a mobile device 114 within the venue 100. At S3, beacon information retrieval component 78, retrieves, from the mobile device 114, any information received by the mobile device 114 from the set of beacons 112. At S4, operational status diagnosis component 80 of system 72, as executed by computer system/server 12, diagnoses the operational status of a beacon 112 based on the information and the determined location.

Process flowchart 600 of FIG. 8 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for anonymous reporting of multiple venue location data to produce patron analytics and insights. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for anonymous reporting of multiple venue location data to produce patron analytics and insights. In this case, the service provider can create, maintain, support, etc., a computer infrastructure that performs the process steps of the invention for one or more customers.

In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for anonymous reporting of multiple venue location data to produce patron analytics and insights. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for diagnosing a beacon in an open architecture, the method comprising:

associating each of a set of beacons in a venue with an associated beacon location, each beacon of the set of beacons in the open architecture being a transmit-only device using a iBeacon technology standard that communicates only by emitting a relatively short-range Bluetooth Low Energy (BLE) electronic signal and that is not connected to a network;

determining a location of a mobile device within the venue with a Wi-Fi based location determiner that does not utilize any beacon of the set of beacons;

retrieving, in real time from an application on the mobile device, any information received by the mobile device from the set of beacons; and diagnosing an operational status of a beacon based on a comparison of the information and the location without utilizing information communicated from the beacon otherwise than via the mobile device.

2. The method of claim 1, wherein the information includes an identifier that uniquely identifies a specific beacon of the set of beacons.

3. The method of claim 2, wherein the diagnosing further comprises determining a strength of a power source of the specific beacon based on a strength of a signal received by the mobile device and a calculated distance between the mobile device and the specific beacon.

4. The method of claim 2, wherein the diagnosing further comprises making a determination that the specific beacon has been moved away from the beacon location associated with the specific beacon in response to the location of the mobile device that is currently receiving information from the specific beacon being removed from the beacon location associated with the specific beacon.

5. The method of claim 1, wherein the diagnosing further comprises making a determination, in response to the location of the mobile device corresponding to the beacon location associated with a particular beacon location and the mobile device receiving no information from the particular beacon, that the particular beacon is either not functioning or the particular beacon has been moved.

6. The method of claim 1, wherein the location of a mobile device within the venue is performed using at least one of: a set of Wi-Fi devices, a set of mobile devices, or a set of GPS satellites.

7. The method of claim 1, wherein the relatively short-range electronic signal is a Bluetooth signal.

8. A computer system for diagnosing a beacon in an open architecture, the computer system comprising:

a memory medium comprising program instructions;

a bus coupled to the memory medium; and a processor for executing the program instructions, the instructions causing the system to:

associate each of a set of beacons in a venue with an associated beacon location, each beacon of the set of beacons being a transmit-only device using a iBeacon technology standard that communicates only by emitting a relatively short-range Bluetooth Low Energy (BLE) electronic signal and that is not connected to a network;

determine a location of a mobile device within the venue with a Wi-Fi based location determiner that does not utilize any beacon of the set of beacons;

retrieve, in real time from an application on the mobile device, any information received by the mobile device from the set of beacons; and diagnose an operational status of a beacon based on a comparison of the information and the location without utilizing information communicated from the beacon otherwise than via the mobile device.

9. The computer system of claim 8, wherein the information includes an identifier that uniquely identifies a specific beacon of the set of beacons.

10. The computer system of claim 9, wherein the diagnosing further comprises determining a strength of a power source of the specific beacon based on a strength of a signal received by the mobile device and a calculated distance between the mobile device and the specific beacon.

11. The computer system of claim 9, wherein the diagnosing further comprises making a determination that the specific beacon has been moved away from the beacon location associated with the specific beacon in response to the location of the mobile device that is currently receiving information from the specific beacon being removed from the beacon location associated with the specific beacon.

12. The computer system of claim 8, wherein the diagnosing further comprises making a determination, in response to the location of the mobile device corresponding to the beacon location associated with a particular beacon location and the mobile device receiving no information from the particular beacon, that the particular beacon is either not functioning or the particular beacon has been moved.

13. The computer system of claim 8, wherein the location of a mobile device within the venue is performed using at least one of: a set of Wi-Fi devices, a set of mobile devices, or a set of GPS satellites.

14. The computer system of claim 8, wherein the relatively short-range electronic signal is a Bluetooth signal.

15. A computer program product for diagnosing a beacon in an open architecture, the computer program product comprising a computer readable storage device, and program instructions stored on the computer readable storage device, to:

associate each of a set of beacons in a venue with an associated beacon location, each beacon of the set of beacons being a transmit-only device using a iBeacon technology standard that communicates only by emitting a relatively short-range Bluetooth Low Energy (BLE) electronic signal and that is not connected to a network;

determine a location of a mobile device within the venue with a Wi-Fi based location determiner that does not utilize any beacon of the set of beacons;

retrieve, in real time from an application on the mobile device, any information received by the mobile device from the set of beacons; and diagnose an operational status of a beacon based on a comparison of the information and the location without utilizing information communicated from the beacon otherwise than via the mobile device.

16. The computer program product of claim 15, wherein the information includes an identifier that uniquely identifies a specific beacon of the set of beacons.

17. The computer program product of claim 16, wherein the diagnosing further comprises determining a strength of a power source of the specific beacon based on a strength of a signal received by the mobile device and a calculated distance between the mobile device and the specific beacon.

18. The computer program product of claim 16, wherein the diagnosing further comprises making a determination that the specific beacon has been moved away from the beacon location associated with the specific beacon in response to the location of the mobile device that is currently receiving information from the specific beacon being removed from the beacon location associated with the specific beacon.

19. The computer program product of claim 15, wherein the diagnosing further comprises making a determination, in response to the location of the mobile device corresponding to the beacon location associated with a particular beacon location and the mobile device receiving no information from the particular beacon, that the particular beacon is either not functioning or the particular beacon has been moved.

20. The computer program product of claim 15, wherein the location of a mobile device within the venue is performed using at least one of: a set of Wi-Fi devices, a set of mobile devices, or a set of GPS satellites and wherein the relatively short-range electronic signal is a Bluetooth signal.

* * * * *